Jan. 17, 1950
J. E. REILLY
2,495,182
REGULATING SYSTEM
Filed Jan. 9, 1947
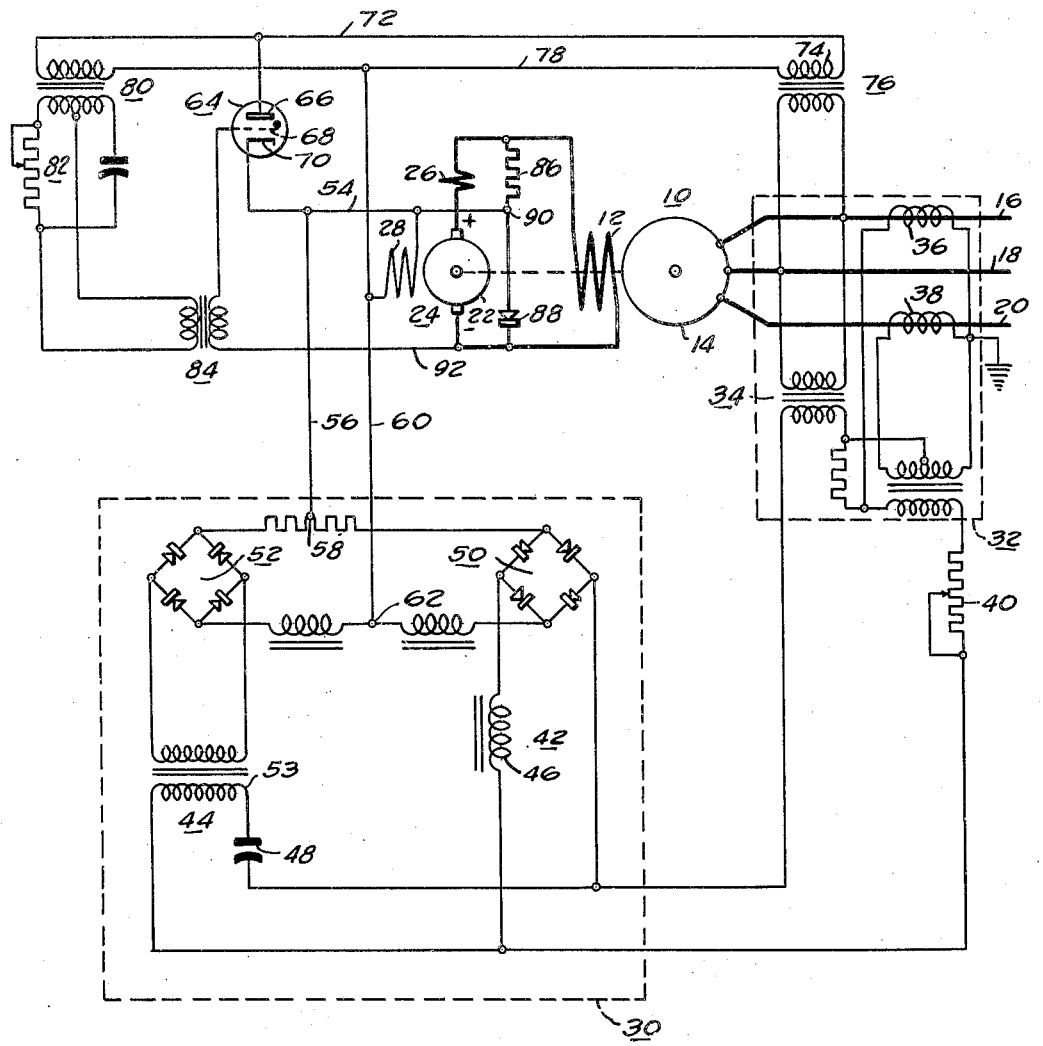
WITNESSES:
E. A. M°Closkey.
W. L. Groome
INVENTOR
Jack E. Reilly.
BY
James N. Ely
ATTORNEY Patented Jan. 17, 1950

2,495,182

UNITED STATES PATENT OFFICE 2,495,182

REGULATING SYSTEM

Jack E. Reilly, Pittsburgh, Pa., assignor to Westinghouse Electric Corporation, East Pittsburgh, Pa., a corporation of Pennsylvania Application January 9, 1947, Serial No. 721,075

5 Claims. (Cl. 323—107)

This invention relates to regulating systems.

An object of this invention is to provide, in a regulating system for a synchronous condenser having a field winding therefor, for limiting the excitation of the synchronous condenser to a value above a predetermined minimum to limit the supply of lagging current therefrom.

Other objects of this invention will become apparent from the following description when taken in conjunction with the accompanying drawing, the single figure of which is a diagrammatic view of a regulating system embodying the teachings of this invention.

Referring to the drawing, there is illustrated a synchronous condenser 10 having a field winding 12 and an armature 14 connected to load conductors 16, 18 and 20. The field winding 12 of the condenser 10 is connected across the armature 22 of a regulating generator or exciter 24 disposed to control the excitation of the field winding 12. As illustrated the regulating generator 24 is of the self excited type being provided with a series field winding 26 and a control field winding 28.

The control field winding 28 is disposed to be normally deenergized when normal line voltage is present across the load conductors 16, 18 and 20 and to be directionally energized as the line voltage departs (raises or lowers) from normal to control or excite the regulating generator 24 to control the excitation of the condenser 10 to correct for such departure. Thus the control field winding 28 is connected through a voltage reference network 30 to be supplied by the line voltage, a network 32 being utilized to derive a positive sequence component of the line voltage for supplying or exciting the field winding 28 in accordance with a measure of the line voltage.

The network 32 comprises the potential transformer 34 for deriving a single phase of the three-phase line voltage having no zero-sequence voltage-component and current transformers 36 and 38 which cause line current to pass through the impedance in the network in such a manner as to produce a voltage drop substantially corresponding to the negative-sequence line voltage, and the voltage drop thus resulting is subtracted from the single phase of the line voltage to produce substantially the positive-sequence component of the line voltage. Reference may be had to the copending application of E. L. Harder, Serial No. 560,299, filed October 25, 1944, which issued as Patent No. 2,426,018 on August 19, 1947, for a more complete description of network 32 and for different embodiments thereof which may be utilized instead of the specific network 32 shown herein.

The voltage reference network 30 is connected to be supplied from the network 32 through an adjustable resistor 40 which provides a voltage adjusting means. As illustrated the network 30 comprises a non-linear impedance circuit 42 and a linear impedance circuit 44 connected to be simultaneously energized in accordance with the line voltage and, in particular, by the positive sequence component of the line voltage. The non-linear impedance circuit 42 includes a saturating reactor 46 whereas the linear impedance circuit 44 includes a capacitor 48. The non-linear impedance circuit 42 and the linear impedance circuit 44 are connected across the input terminals of dry-type rectifying units 50 and 52, respectively, an insulating transformer 53 being connected between the capacitor 48 and rectifying unit 52. The output terminals of the rectifying units 50 and 52 are connected in series circuit relation with each other through suitable resistors and series-connected smoothing reactors.

Thus, the network 30 has two circuits which have intersecting impedance characteristics so that as the line voltage varies from normal, such as for a raise in voltage, the saturating reactor 46 draws more current, and at lower voltages the capacitor 48 draws more current. By connecting one end of the control field winding 28 of the regulating generator 24 through conductors 54 and 56 to the tap 58 of the direct-current series circuit connecting the rectifying units 50 and 52, and the other end of the control field winding 28 by conductor 60 to tap 62 of the series circuit of the rectifying units, directional energization of the control field winding 28 may be obtained as the line voltage departs from a normal value.

As is apparent, the excitation of the condenser 10 is dependent upon the directional energization of the control field winding 28. Thus, for example, if the potential across rectifying unit 50 is large compared with the potential across rectifying unit 52, current flows from tap 62 of the voltage reference circuit 30 through conductor 60, field winding 28 and conductors 54 and 56 to tap 58 of the reference circuit 30 to energize the field winding 28 and effect an action in opposition to the action of the series field winding 26 to decrease the excitation of the regulating generator 24. As the output of the regulating generator 24 is decreased, the excitation of the condenser 10 is also decreased, and if such excitation effect is continued, it is possible for the excitation of the condenser to pass through zero and reverse.

In order to prevent such an operation of the condenser 10 as has just been described and to limit the supply of lagging current from the condenser, a control circuit is provided for limiting the energization of the control field winding 28 in the direction to produce an action in opposition with the action of the series field winding 26 to thereby limit the decrease in the output of the regulating generator 24 and consequently limit the lowering of the excitation of the condenser 10 below a predetermined value. For this purpose a gaseous electric discharge valve 64 is connected in circuit with the control field winding 28 for effecting flow of current therein in opposition to the flow of current which produces the opposing action just described.

The discharge valve 64 is provided with an anode 66, a grid 68 and a cathode 70. The anode 66 is connected by conductor 72 to one end of the secondary winding 74 of a transformer 76, the primary winding of which is connected across line conductors 16 and 18. The cathode 70 is connected by conductor 54 through the control field winding 28, and conductors 60 and 78 to the other end of the secondary winding 74 of transformer 76.

As illustrated, provision is made to control the bias of grid 68 of discharge valve 64 in accordance with the excitation of the synchronous condenser 10. An alternating current potential is normally supplied to the grid 68 from a source of supply represented by conductors 72 and 78 which are connected by transformer 76 across line conductors 16 and 18, the potential being supplied through a transformer 80, the phase shifting circuit 82 and the grid transformer 84. The discharge valve 64 is of the well known thyratron type, the conductivity thereof being controlled by the grid-cathode potential which is made up of an alternating-current potential superimposed on a direct-current biasing potential so that the resultant grid-cathode potential becomes more positive than the critical potential of the discharge valve to render the valve conductive. Thus control of the conductivity of the discharge valve 64 is obtained by varying the direct-current biasing potential.

For this purpose a measuring circuit consisting of a series connected resistor 86 and a dry type rectifier 88 is connected across the output terminals of the regulating generator 24 and the cathode 70 is connected by conductor 54 to the tap 90 at one end of the rectifier 88, the other end of the rectifier 88 being connected by conductor 92 through the secondary winding of the grid transformer 84 to the grid 68. Thus the actual direct current grid potential is a measure of the potential drop across the rectifier 88.

By taking the direct current grid potential as the potential drop across a dry type rectifier 88 such as a copper oxide or selenium rectifier advantage is taken of the well-known inverse resistance characteristics of such rectifiers. Thus as the output voltage of the exciter or regulating generator 24 rises above a predetermined value, the resistance of the rectifier 88 decreases abnormally and since the direct-current grid potential of valve 64 is actually the potential drop across the rectifier 88, the direct-current grid potential is limited to a safe value for the valve. On the other hand, as the voltage output of the exciter 24 decreases towards a predetermined minimum voltage output, the potential drop across rectifier 88 will be nearly equal to the voltage across the exciter 24 since the resistance of the rectifier inceases abnormally with such decrease in the voltage output of the exciter or regulating generator 24. Thus it is seen that the firing of the valve 64 is dependent upon the output of the regulating generator 24 for as the voltage output thereof decreases to its predetermined minimum value or level, the direct-current grid potential is decreased so that it becomes less negative and permits the phase shifted alternating-current potential as supplied by the grid transformer 84 to cut the critical grid potential of the valve 64 whereupon the valve begins to fire and pass current to the control field winding 28.

In operation with the regulating generator 24 and the synchronous condenser 10 and with the circuits connected as shown, for a predetermined voltage across conductors 16, 18 and 20, the generator 24 is self excited by reason of the series field winding 26 and the excitation of the condenser 10 is sufficient to maintain the predetermined voltage across the conductors 16, 18 and 20.

If the load conditions on conductors 16, 18 and 20 should change so that, for example, the voltage across conductors 16, 18 and 20 should increase, then the system operates to control the excitation of the condenser 10 to control the lagging current of the condenser 10 to effect the return of the voltage across the conductors 16, 18 and 20 to the initial predetermined value. Thus, as the voltage across conductors 16, 18 and 20 increases, the voltage reference network 30 becomes unbalanced with the result that control field winding 28 is energized to effect an action in opposition to the action of the series field winding 26 to decrease the output of the regulating generator 24, as described hereinbefore. The resulting decrease in the excitation of the synchronous condenser 10 is normally sufficient to produce a corrective action to return the voltage across conductors 16, 18 and 20 to the predetermined value which is to be maintained.

In order to protect the synchronous condenser 10 from excessive heating by too low an excitation, when the output voltage of the regulating generator 24 decreases to a predetermined minimum voltage, the rectifier 88 is so selected that its resistance is of a value at the predetermined minimum voltage of the regulating generator 24, that the potential drop across the rectifier 88 is substantially equal to the output voltage of the generator 24. Under such conditions, the direct-current grid potential of valve 64 is so decreased and becomes less negative that the resultant grid-cathode potential of valve 64 rises above the critical potential of the valve and the valve becomes conducting.

As the valve 64 becomes conducting, current flows in the circuit which extends from the secondary winding 74 of transformer 76 through conductor 72, anode 66, cathode 70, conductor 54, control field winding 28 and conductors 60 and 78 to the secondary winding 74. The current thus passed by the valve 64 flows through the control field winding 28 in opposition to the flow of current from the voltage reference network 30 to decrease the action of the control field winding 28 in opposition to the action of the series field winding 26 to maintain the excitation of the regulating generator 24 at a value sufficient to insure the output of the predetermined minimum voltage required for preventing further lowering of the excitation of the synchronous condenser 10. Thus the rectifier 88 and the valve 64 cooperate to limit the extent of permissible decrease in the excitation of the synchronous condenser 10. It is, of course, appreciated that as the voltage output of the regulating generator 24 increases above the minimum voltage requirements of the excitation circuit that the direct current grid potential controlled by the drop across the rectifier 88 becomes more negative to prevent the valve 64 from firing and the control of the current flow through control field winding 28 is then entirely dependent upon the balance of the voltage reference network 30.

If, for example, the voltage across conductors 16, 18 and 20 should decrease at any time such that the voltage output of the regulating generator 24 is above the minimum voltage requirements then the voltage reference network becomes unbalanced as the capacitor 48 draws more current than the reactor 46 and the tap 58 becomes more positive than the tap 62. Current thus flows from the tap 58 through conductors 56 and 54, control field winding 28 and conductor 60 to tap 62 to effect an action to aid the action of the series field winding 26, to effect an increase in the excitation of the regulating generator 24. As the output of the regulating generator 24 is thus increased the excitation of the synchronous condenser 10 is increased to produce a corrective action to return the voltage across conductors 16, 18 and 20 to the predetermined value which is to be maintained.

The system of this invention is efficient in operation and provides a sensitive regulating operation while preventing damage to the synchronous condenser by reason of limiting the permissible decrease in the excitation of the synchronous condenser. The apparatus utilized is of standard construction and can be readily duplicated.

I claim as my invention:

1. In a regulating system for maintaining an electrical condition of a predetermined value on a power line having a synchronous condenser connected thereto, in combination, means disposed to be operated to control the excitation of the synchronous condenser, means disposed to be energized to control the operation of the control means, means for connecting the energizable means to the power line to directionally control the energization thereof in accordance with the departure of the electrical condition from said predetermined value, an electric discharge valve disposed to connect the energizable means to a source of energy, and means connected to the control means to provide a source of direct current voltage dependent upon the operation of the control means to render the valve conducting under predetermined operating conditions of the control means thereby to effect the energization of the energizable means in a predetermined manner to prevent a decrease in the excitation of the synchronous condenser below a predetermined value.

2. In a regulating system for maintaining an electrical condition of a predetermined value on a power line having a synchronous condenser connected thereto, in combination, means disposed to be operated to control the excitation of the synchronous condenser, means disposed to be energized to control the operation of the control means, means for connecting the energizable means to the power line to directionally control the energization thereof in accordance with the departure of the electrical condition from said predetermined value, means connected to the control means to provide a source of direct current voltage dependent upon the operation of the control means, and an electric discharge valve disposed to connect the energizable means to a source of energy, the electric discharge valve having a grid connected in circuit relation with the source of direct current voltage whereby the source of direct current voltage controls the conductivity of the discharge valve to render the valve conducting to effect the energization of the energizable means in a predetermined manner under predetermined operating conditions of the control means to prevent a decrease in the excitation of the synchronous condenser below a predetermined value.

3. In a regulating system for maintaining an electrical condition of a predetermined value on a power line having a synchronous condenser connected thereto, in combination, a regulating generator connected to control the excitation of the synchronous condenser, a control field winding for the regulating generator disposed to be directionally energized, means for connecting the control field winding to the power line to effect the directional energization thereof in accordance with the departure of the electrical condition from said predetermined value, means connected across the regulating generator to provide a source of direct current voltage dependent upon the output voltage of the regulating generator and of substantially equal value therewith at a predetermined minimum output voltage thereof, an electric discharge valve disposed to connect the control field winding to another source of energy, and means connecting the electric discharge valve to the source of direct current voltage to render the valve conducting when the direct current voltage decreases to substantially equal said predetermined minimum output voltage of the regulating generator.

4. In a regulating system for maintaining an electrical condition of a predetermined value on a power line having a synchronous condenser connected thereto, in combination, a regulating generator connected to control the excitation of the synchronous condenser, a control field winding for the regulating generator disposed to be directionally energized, means for connecting the control field winding to the power line to effect the directional energization thereof in accordance with the departure of the electrical condition from said predetermined value, an electric discharge valve disposed to connect the control field winding to a source of energy to effect an increase in the excitation of the regulating generator, and means connected across the regulating generator to provide a source of direct current voltage dependent upon the output of the regulating generator and of substantially equal value therewith at a predetermined minimum output voltage thereof to render the valve conducting to effect the energization of the control field winding in opposition to the energization thereof by the connecting means to maintain the excitation of the regulating generator at a value sufficient to maintain the output voltage thereof at not less than said predetermined minimum output voltage.

5. In a regulating system for maintaining an electrical condition of a predetermined value on a power line having a synchronous condenser connected thereto, in combination, a regulating generator connected to control the excitation of the synchronous condenser, a control field winding for the regulating generator disposed to be directionally energized, means for connecting the control field winding to the power line to effect the directional energization thereof in accordance with the departure of the electrical condition from said predetermined value, means connected across the regulating generator to provide a source of direct current voltage dependent upon the output of the regulating generator and of substantially equal value therewith at a predetermined minimum output voltage thereof, and an electric discharge valve disposed to connect the control field winding to a source of energy to effect an increase in the excitation of the regulating generator, the electric discharge valve having a grid connected in circuit relation with the source of direct current voltage whereby the source of direct current voltage controls the conductivity of the discharge valve to render the discharge valve conducting when the output voltage of the regulating generator decreases to substantially the said predetermined minimum value.

JACK E. REILLY.

REFERENCES CITED

The following references are of record in the file of this patent:

UNITED STATES PATENTS

| Number | Name | Date |
| --- | --- | --- |
| 2,209,233 | Moyer | July 23, 1940 |
| 2,371,030 | Crary | Mar. 6, 1945 |